US009950871B2

(12) United States Patent
Prieto Male et al.

(10) Patent No.: US 9,950,871 B2
(45) Date of Patent: Apr. 24, 2018

(54) METHOD FOR THE CONTINUOUS MANUFACTURE AND FILLING OF FLEXIBLE CONTAINERS

(71) Applicant: VOLPAK, S.A.U., Santa Perpetua de Mogoda (ES)

(72) Inventors: Albert Prieto Male, Olot (ES); Miguel Angel Leon Gonzalez, Sant Quirze Del Valles (ES)

(73) Assignee: VOLPAK, S.A.U., Santa Perpetua De Mogoda (ES)

( * ) Notice: Subject to any disclaimer, the term of this patent is extended or adjusted under 35 U.S.C. 154(b) by 1015 days.

(21) Appl. No.: 14/057,744

(22) Filed: Oct. 18, 2013

(65) Prior Publication Data

US 2014/0110222 A1    Apr. 24, 2014

(30) Foreign Application Priority Data

Oct. 19, 2012 (EP) .................................... 12382403

(51) Int. Cl.
| | |
|---|---|
| *B65B 43/12* | (2006.01) |
| *B65B 43/46* | (2006.01) |
| *B65B 65/00* | (2006.01) |
| *B65B 65/02* | (2006.01) |
| *B65G 29/00* | (2006.01) |

(52) U.S. Cl.
CPC ............ *B65G 29/00* (2013.01); *B65B 43/465* (2013.01); *B65B 65/003* (2013.01); *B65B 43/123* (2013.01); *B65B 65/02* (2013.01)

(58) Field of Classification Search
CPC ....... B65B 43/465; B65B 43/50; B65B 43/52; B65B 65/003; B65G 29/00

USPC .......................... 53/251, 253, 469; 198/469.1
See application file for complete search history.

(56) References Cited

U.S. PATENT DOCUMENTS

| | | | |
|---|---|---|---|
| 3,018,006 A | * | 1/1962 | Zilahy .................... B65G 29/00 198/803.7 |
| 3,691,718 A | | 9/1972 | Woodruff et al. |

(Continued)

FOREIGN PATENT DOCUMENTS

| | | |
|---|---|---|
| EP | 1 043 233 A1 | 10/2000 |
| EP | 1 247 767 A1 | 10/2002 |

(Continued)

OTHER PUBLICATIONS

European Search Report issued in Application No. EP 12 38 2403 dated Apr. 2, 2013.

*Primary Examiner* — Stephen F Gerrity
*Assistant Examiner* — Patrick Fry
(74) *Attorney, Agent, or Firm* — Sughrue Mion, PLLC

(57) ABSTRACT

The present invention relates to a packaging method comprising the operation of transferring containers to an endless conveyor element moving forward continuously, conveying suspended containers and describing a closed trajectory imposed by a series of rotary diverting elements using to that end a container transferring device assembled on one of the diverting elements of the endless conveyor element, and rotating in a synchronized manner therewith. A device for putting the method into practice comprises a rotary body driving a plurality of clamps guided by mechanisms which can further slow down the displacement of the clamps without changing the rotating speed of the rotary body.

7 Claims, 8 Drawing Sheets

(56) References Cited

U.S. PATENT DOCUMENTS

| | | | | |
|---|---|---|---|---|
| 3,851,751 | A | * 12/1974 | Jones | B65B 43/30 198/803.5 |
| 4,037,370 | A | 7/1977 | Williams | |
| 4,353,198 | A | 10/1982 | Koppe | |
| 6,082,077 | A | * 7/2000 | Christ | B65B 43/52 198/408 |
| 6,112,881 | A | * 9/2000 | Osti | B65B 19/226 198/468.2 |
| 6,662,936 | B2 | * 12/2003 | Ikemoto | B65G 37/005 141/166 |
| 6,688,080 | B2 | * 2/2004 | Kinigakis | B29C 65/08 53/133.4 |
| 6,712,196 | B2 | * 3/2004 | Ikemoto | B65B 43/465 198/430 |
| 2007/0000206 | A1 | * 1/2007 | Berger | B65B 43/50 53/167 |

FOREIGN PATENT DOCUMENTS

| | | | | |
|---|---|---|---|---|
| EP | 2 508 434 | A1 | 10/2012 | |
| EP | 2508434 | A1 * | 10/2012 | B65B 43/465 |
| WO | WO 2011113458 | A1 * | 9/2011 | B65B 5/022 |

* cited by examiner

METHOD FOR THE CONTINUOUS MANUFACTURE AND FILLING OF FLEXIBLE CONTAINERS

TECHNICAL FIELD OF THE INVENTION

The invention relates to a method for the manufacture of flexible containers comprising the operation of transferring the containers to an endless conveying element which continuously conveys the suspended containers while the containers are manipulated, for example for filling and sealing. The invention also relates to a device which allows performing the operation of transferring the containers from a standby location outside the area demarcated by the trajectory which the conveyor element follows to said conveyor element for manipulation during the suspended conveyance thereof, and to a system comprising a particular arrangement of the device and the endless conveyor element.

BACKGROUND OF THE INVENTION

The scope of the invention more specifically relates to packaging systems comprising a packaging module for performing at least two operations on flexible containers arranged in a row which are conveyed in a suspended manner from an endless conveyor element, such as a chain conveyor, for example. The only known example of a packaging module of this type is described in European patent application No. 11382096.

These packaging modules must be fed with empty formed containers. Many proposals for manufacturing empty flexible sachet-type containers or containers of the types having the capacity to remain upright, also called doypack, producing containers that are open at the top and ready to be manipulated, for example, for their subsequent filling and sealing, from one or several bands of flexible, heat sealable material, are known. The containers obtained must be subjected to a transfer operation for feeding the conveyor element of the packaging module. This transfer becomes complicated when the produced empty containers are supplied intermittently, for example, in twos, while the conveyor element moves forward continuously.

Carousel packaging machines use transferring devices which link the container forming modules with the packaging modules and which are arranged to that end between both modules.

Therefore, transferring devices comprising groups of clamps performing alternative back and forth movements between a container production module and a packaging module, for example, are known. These groups of clamps are capable of seizing respective containers located in a static standby or delivery position of the production module and giving them a linear trajectory coinciding with a linear section of the trajectory followed by the container holding means provided to the carousel for releasing them once the containers are secured by said holding means and recovering their starting position to repeat the same operation again.

One objective of the invention is a method and a device which simplifies this transfer operation.

Another objective of the invention is a method and a device which allows reducing the surface necessary for carrying out this transfer operation, and even allows, according to one embodiment, eliminating the surface occupied up until now by the transferring device linking a forming module with a packaging module.

In addition to the operation performed by the transferring devices, the use of an endless conveying element in a packaging module also requires performing the operation of delivering or releasing the end containers. This operation sometimes requires a second transferring device capable of seizing the containers which are conveyed by the conveyor element and arranging them in a delivery location.

One objective of the invention is a method and a device which simplifies this operation, and even allows, in an embodiment variant, performing the two transfer operations, the operation of feeding the endless element and the operation of unloading the endless element by means of a single device.

On the other hand, as suggested above, the container production modules supply the containers intermittently, this means that in the standby position there is a reserve of containers or that these containers remain static while the endless conveyor element moves forward continuously. Likewise, when removing the containers from the conveyor element, they must be slowed down prior to their delivery to prevent container imperfections. Therefore, another objective of the present invention is a device which, in addition to achieving the main objectives of the invention, may be capable of seizing one or more containers at the same time in a static standby position and transferring them to the conveyor element and at the same time removing containers from this conveyor and releasing them in a delivery position with very little or no inertia, all this without changing the packaging module productivity.

Finally, the device must be capable of conferring speed and trajectory coinciding with that of the endless conveyor element to the seized containers and of separating them from one another by a distance equivalent to the distance separating the holding means of each container in the conveyor element.

DISCLOSURE OF THE INVENTION

The packaging method according to the invention is essentially characterized in that it comprises the operation of transferring containers to an endless conveyor element moving forward continuously, conveying suspended containers and describing a closed trajectory imposed by a series of rotary diverting elements using to that end a container transferring device assembled on one of the diverting elements of the endless conveyor element, and rotating in a synchronized manner therewith, all this as described in claim 1.

In a variant of interest, the diverting element is located within the area demarcated by the closed trajectory which the endless conveyor element follows.

In the event that the diverting element is configured in the form of a diverting wheel, in one embodiment, in the operation of transferring the containers, these are transferred to the endless conveyor element while it contacts or links up with the diverting wheel and follows an arc of circumference trajectory.

In a variant of interest, along a section (a) of the closed trajectory on which the endless conveyor element contacts or links up with the diverting wheel, in a first sector (a1) the transferring device transfers containers to be manipulated from a standby position located outside the closed trajectory which said endless conveyor element follows to the endless conveyor element; and in a second sector (a2) the same transferring device transfers manipulated containers from the endless conveyor element to a delivery position located outside the closed trajectory which said endless conveyor element follows.

The angle of contact of the endless conveyor element with the diverting element is preferably greater than 180°.

A container transferring device for putting the method according to the invention into practice comprises a rotary body driving a plurality of clamps guided by mechanisms which can further slow down the displacement of the clamps without changing the rotating speed of the rotary body. This device is described in claim 6 and it comprises said rotary body rotating continuously about a vertical rotating shaft; a plurality of clamps driven by the movement of the rotary body and radially distributed about the rotating shaft; and mechanisms driven by the relative movement of the rotary body with respect to at least one preferably fixed control component of the device suitable for guiding the displacement of the clamps following a closed trajectory about the rotating shaft, for speeding up and slowing down the displacement movement of the clamps; for varying the gap between the clamps; and for closing and opening the clamps sufficiently to seize and release the containers to be transferred, respectively.

In one embodiment, the device is coupled to a diverting element of an endless conveyor element rotating about the same vertical rotating shaft as that of the rotary body, said diverting element and the rotary body driving the clamps of the transferring device being coupled mechanically or electronically for rotating in a synchronized manner, the diverting element being located such that the endless conveyor element is at a level below the clamps.

In a variant of this embodiment, the closed trajectory which the clamps follow about the rotating shaft comprises at least one section coinciding with the trajectory which the endless conveyor follows along its contact with the diverting element.

According to an embodiment of the device, the mechanisms are adapted for slowing sufficiently down the movement of the clamps with respect to the rotating shaft on at least two occasions along one and the same turn of the rotary body and such that in one of them the open clamps are closed for seizing containers placed in a standby position and in another the clamps closed sufficiently for seizing a container are opened for releasing said containers in a delivery position different from the standby position, all this without changing the rotating speed of the rotary body.

For this purpose, according to a variant of the invention the mechanisms comprise a series of articulated structures each of which comprises a radial arm, optionally articulated by a mid point, with an inner segment connected in a guided and slidable manner on a cam follower, linked to a first cam channel which forms a closed path about the rotating shaft and is integral with the control component of the device, in turn the cam follower also being assembled in a guided and slidable manner on an articulated attachment connecting with the rotary body; and with an outer segment supporting one of the clamps of the device, linked to a second cam channel which also forms a closed path and is integral with the control component of the device, the path of the first cam channel comprising at least one concave segment with respect to the rotating shaft which, together with the path which the second cam channel follows, arranges the first runner in a static position or transmits a small enough movement thereto even when the rotary body does not stop rotating for seizing a container located in the standby position or releasing a container in its delivery position.

In order to separate the clamps and therefore the containers to be transferred, the distance separating the containers in a standby position and that separating two consecutive holding means in the endless conveyor element can be varied during the transfer operation, and to enable regulating this distance according to different container formats, different variants of the invention providing a solution to this need are contemplated.

The invention contemplates that the clamps of the device comprise two gripping fingers capable of moving closer to and away from one another for seizing or releasing a container respectively, according to two different movements: by rotating one of the fingers about a first rotating shaft and by rotating at least the same finger about a second rotating shaft (62) or alternatively by displacing at least one of the fingers along a straight trajectory perpendicular to the gripping plane (B) of the container.

Another aspect of the invention subsequently discloses a packaging system comprising a packaging module with an endless conveyor element holding and conveying previously formed suspended flexible containers moving forward continuously and describing a closed trajectory imposed by a series of diverting elements; and a container transferring device according to the invention in which at least one section (a') of the trajectory which the clamps driven by the rotary body of the device follow coincides with a section (a) of the closed trajectory which the endless conveyor element of the packaging module follows during which said endless conveyor element contacts or links up with one of the diverting elements.

In line with one of the preferred embodiments of the method described above, the device is assembled on one of the diverting elements of the endless conveyor element located within the area demarcated by the closed trajectory which said endless conveyor element follows; such that along the section (a) on which the endless conveyor element contacts or links up with the mentioned diverting element, in a first sector (a1) the device transfers containers from the standby position to the conveyor element and in a second sector (a2) the same device transfers containers from the endless conveyor element to a delivery position, said standby and delivery positions being located outside the closed trajectory which the endless conveyor element follows.

DETAILED DESCRIPTION OF THE INVENTION

Figure 1A:
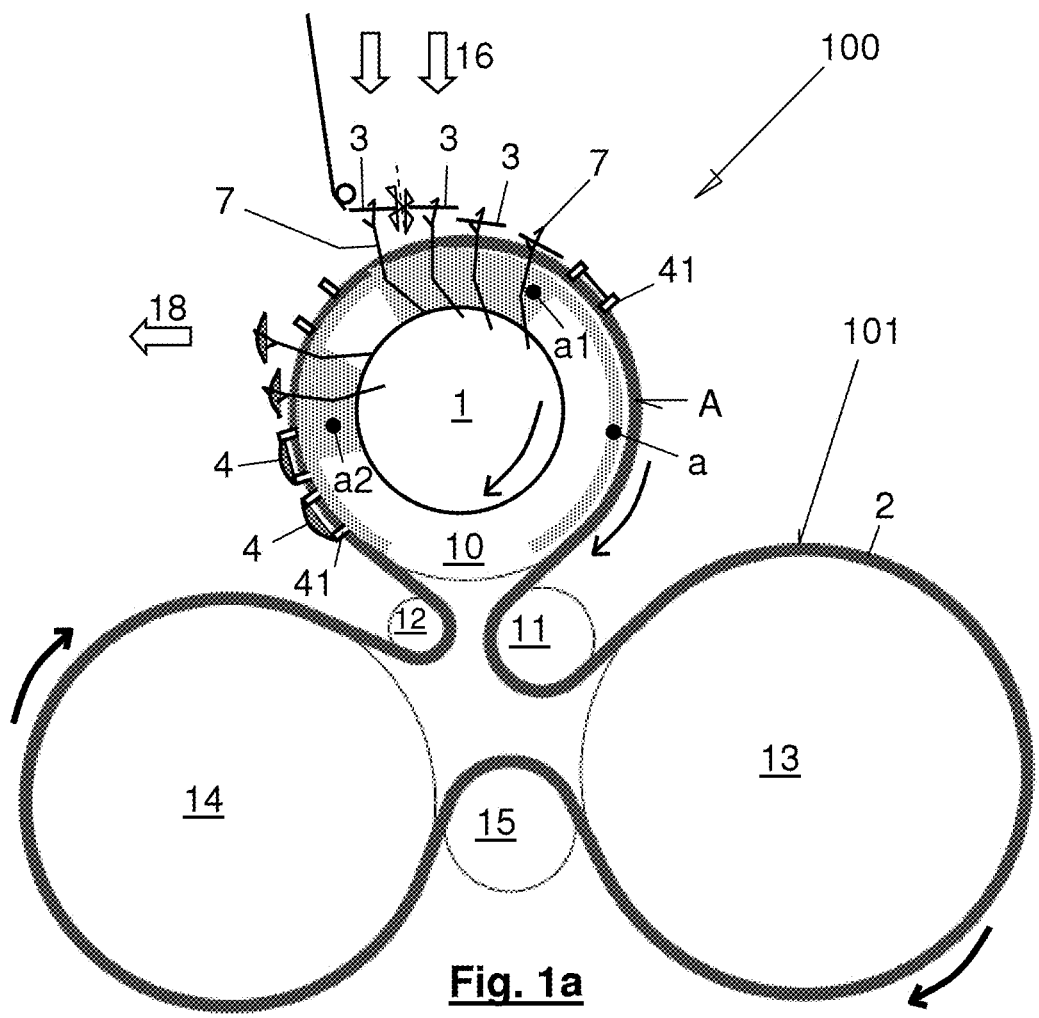
FIG. 1*a* is a schematic view of a packaging system according to the invention comprising a packaging module and a transferring device for feeding and removing containers to/from the mentioned packaging module.

FIG. 1a shows a packaging system 100 capable of performing at least two operations on containers 4 arranged in a row, said operations being performed after forming said containers 4. The system 100 virtually comprises:

a packaging module 101 with an endless conveyor element 2 for conveying containers 4 formed by a chain provided with a series of holding means 41 for holding the previously formed containers 4 in a suspended manner, and moving forward continuously describing a closed trajectory (A) imposed by diverting elements 10 to 15, hereinafter referred to as diverting wheels 10 to 15 as they have this configuration in the example of FIG. 1a, and of which wheels 13 and 14 are provided with means for manipulating the conveyed containers 4, specifically for filling and closing said containers 4, respectively, while the chain contacts with the mentioned diverting wheels 13 and 14. One example of a packaging module 101 with these features is described in European patent application document No. 11382096.

a container transferring device 1 used for feeding the chain of the packaging module 101 with newly formed containers 3 for manipulation and also for removing already manipulated containers 4 from the chain.

As shown in FIG. 1a, the transferring device 1 is assembled on the diverting wheel 10 of the endless conveyor element 2, such that it rotates in a synchronized manner therewith as will be explained in more detail below.

This diverting wheel 10 is a wheel which is located within the area demarcated by the closed trajectory (A) which the endless conveyor element 2 follows allowing the same transferring device 1 to be able to perform the operation of feeding and removing the containers to/from the packaging module 101 all this while the endless conveyor element 2 contacts or links up with the diverting wheel 10 and thus follows a curved trajectory.

The formed containers 3 which must be supplied to the endless conveyor element 2 of the packaging module 101 are obtained in a conventional manner, for example, in a forming module moving forward intermittently. In the example, two containers 3 which are separated a moment before being transferred to the packaging module 101 are obtained in every forward movement of the forming module. These containers 3 will remain in a standby position 16 located outside the trajectory (A) of the endless conveyor element 2 waiting to be seized by the transferring device 1. This operation is indicated by the vertical arrows of FIG. 1a.

Along the section (a) on which the endless conveyor element 2 contacts or links up with the diverting wheel 10, in a first sector (a1) the transferring device 1 will transfer the two containers 3 from the mentioned standby position 16 to the endless conveyor element 2 without interrupting its continuous forward movement. Simultaneously, in a second sector (a2) the same transferring device 1 will transfer already manipulated containers 4 from the endless conveyor element 2 to a delivery position 18 also located outside the closed trajectory (A) which the endless conveyor element 2 follows. This operation is indicated by the horizontal arrow of the same FIG. 1a.

As schematically shown in FIG. 1a, to perform these operations of feeding and removing containers to/from the packaging module 101, the device 1 uses clamps 7 driven by mechanisms which will be described below.

It must be highlighted that the angle of contact of the endless conveyor element 2 with the diverting wheel 10 is greater than 180°, which favors the ability to perform both operations simultaneously and with the same transferring device 1.

Figure 1B:
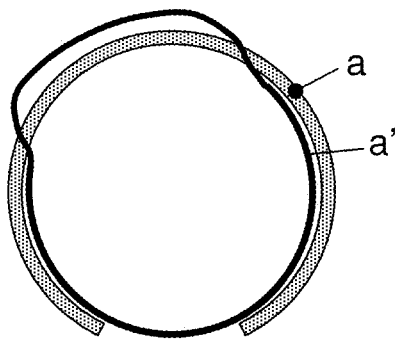
FIG. 1*b* is a diagram of the approximate trajectories which the clamps of the transferring device and the endless conveying element of the packaging module can follow during their contact with the diverting wheel rotating in a synchronized manner with the transferring device.

As described below, to enable performing the operations of feeding and removing the containers which must be manipulated and which have been manipulated to/from the packaging module 101, respectively, the device 1 must essentially displace the clamps 7 and therefore the secured containers according to a trajectory (a') (see FIG. 1b) coinciding, in at least part of the sectors a1 and a2 described above, with the section (a) of the trajectory (A) of the endless conveyor element 2. Furthermore, the device 1 must also be capable of separating the two containers 3, which in the standby position 16 are contiguous, from one another according to the distance separating two consecutive containers 4 from one another in the endless conveyor element 2.

The trajectories of the clamps 7 and of the endless conveyor element 2 must coincide sufficiently so that the containers 3 which are transferred to the packaging module 101 and the containers 4 which are removed from the packaging module 101 are simultaneously seized by the holding means 41 of the endless conveyor 2 and by the clamps 7 of the device 1 for a moment.

Figure 2:
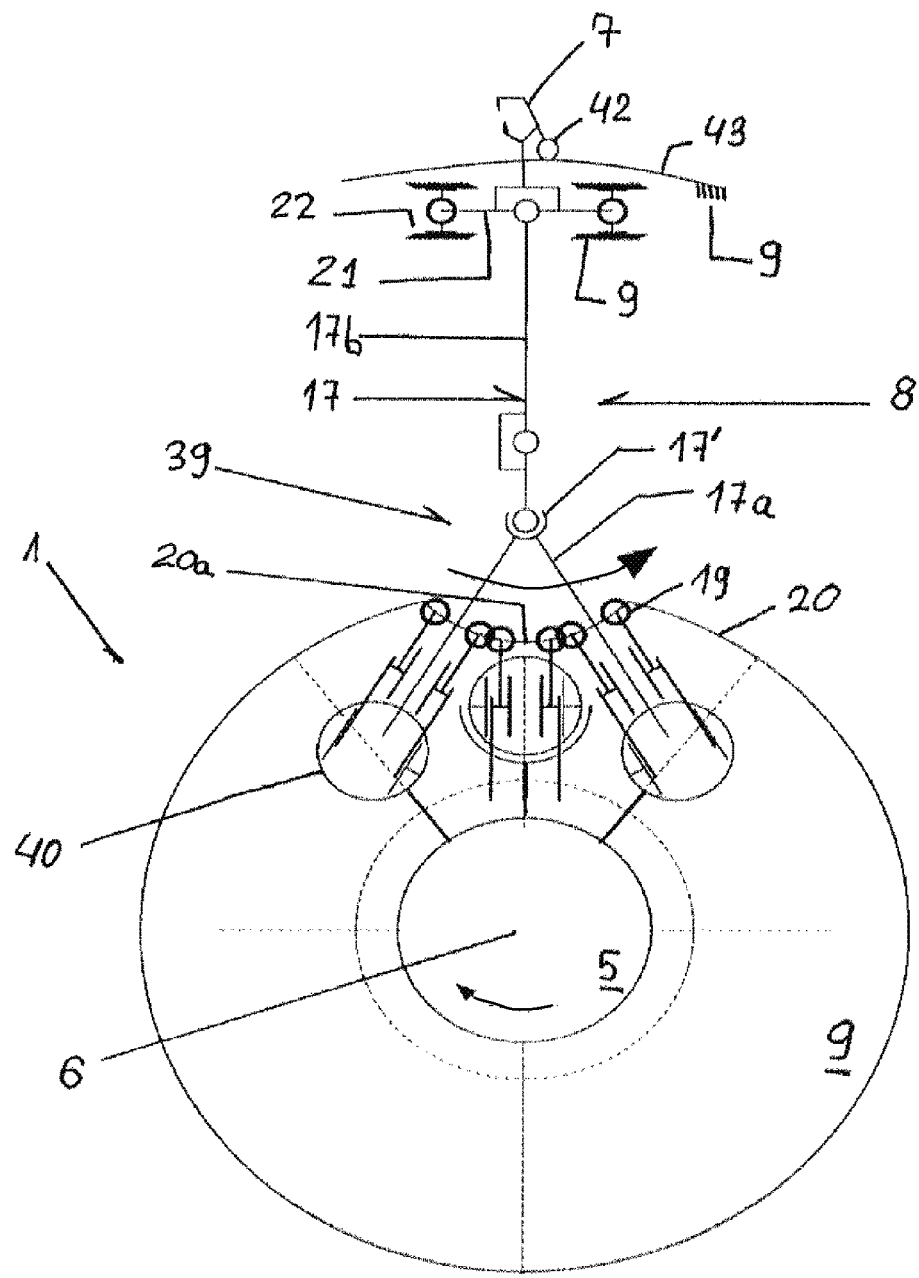
FIG. 2 is a schematic view of a first embodiment of a container transferring device for a system such as that of FIG. 1, showing the drive mechanism for driving one of the clamps intended for holding and transferring containers to or from the packaging module.

FIG. 2 schematically shows a container transferring device 1 suitable for this purpose. A single clamp 7 and its corresponding drive mechanisms have been depicted in this device 1 of FIG. 2 for a better understanding of its operation.

The container transferring device 1 comprises a rotary body 5 assembled on the diverting wheel 10 (see FIG. 1) of the packaging module on which the endless conveyor element 2 rests. The rotary body 5 and the mentioned diverting wheel 10 rotate in a synchronized manner in one and the same direction of rotation about the vertical rotating shaft 6, depicted in FIG. 2.

The synchronization can be implemented, for example, by mechanical coupling, magnetic coupling or by means of the intervention of independent drive servo-motors for the diverting wheel 10 and the rotary body 5.

FIG. 2 shows that the clamp 7 is linked to a mechanism 8 attached to the rotary body 5 and is driven by the relative movement thereof with respect to a control component 9 fixed to the installation. The mechanism 8 is suitable for at least arranging the clamp 7 along the sector (a1) (see FIG. 1a) for seizing a container 3 from those placed in the standby position 16; driving said clamp 7 for seizing the container 3; conferring the clamp 7 and therefore the container 3 seized by the clamp a speed and a trajectory coinciding with that which the endless conveyor element 2 follows during its contact with the diverting wheel 10; and driving the clamp 7 for releasing the container 3 once it is secured by the holding means 41 which said endless conveyor 2 is provided with.

In turn, the same mechanism 8 will drive the same clamp 7 along the sector (a2) (see FIG. 1a) such that it will confer the clamp 7 a speed and a trajectory coinciding with that which the endless conveyor element 2 follows for seizing a manipulated container 4, i.e., a filled and sealed container;

driving the clamp 7 for seizing said manipulated container 4; arranging the clamp 7 in the delivery position 18; and driving the clamp 7 for releasing the container 4.

To perform this holding operation, the drive mechanism 8 for driving the clamp 7 comprises an articulated structure 39 capable of slowing down the movement of the clamp 7 sufficiently with respect to the rotating shaft 6 when the clamp 7 is arranged for seizing the container without it being necessary to that end to change the rotating speed of the rotary body 5 which is synchronized with the diverting wheel 10.

In fact, FIG. 2 illustrates the sequence of movements which occurs for arranging the clamp 7 in the suitable position for holding a container 3 located in its standby position, having been depicted in the same figure the different positions adopted by the articulated structure 39 during a part of the rotation of the rotary body 5 corresponding with the phase of holding the container 3 to be transferred to the packaging module 101.

It is observed that the articulated structure 39 comprises a radial arm 17, articulated by a midpoint 17', the inner segment of which 17a is connected in a guided and slidable manner on a cam follower 19, linked to a first cam channel 20 which forms a closed path about the rotating shaft 6 and is integral with the control component 9 of the device 1, in turn the cam follower 19 also being assembled in a guided and slidable manner on an articulated attachment 40 connecting with the rotary body 5.

In turn, the outer segment 17b of the radial arm 17 is attached firmly to a first runner 21 supporting the clamp 7, linked to a second cam channel 22 which also forms a closed path and is integral with the control component 9 of the device 1.

FIG. 2 shows how the path of the first cam channel 20 comprises a concave segment 20a with respect to the rotating shaft 6 which, together with the path which the second cam channel 22 follows, arranges the first runner 21 in a static position or transmits a small enough movement thereto even when the rotary body 5 does not stop rotating for seizing the container 3 located in the standby position 16, as illustrated by the sequence of FIG. 2.

The second cam channel 22 comprises another section (not depicted in FIG. 2) the contour of which will guide the runner 21 to suitably position it and to give it a trajectory coinciding with the trajectory (A) of the endless conveyor element 2 during its contact with the diverting wheel 10 so that the holding means 41 provided in the mentioned endless conveyor element 2 can secure the container 3 for completing the operation of transferring to the packaging module 101, before the clamp 7 releases the container 3.

Regarding the opening and closing movement of the clamp 7, this is driven by cam means 42 driven by corresponding cam surfaces 43, also integral with the control component 9 of the device 1, only depicted schematically in FIG. 2 and which will be mentioned in more detail below.

The same solution illustrated in FIG. 2 is applicable for slowing down the movement of the clamp 7 when the container 4 is to be released and deposited in its delivery position 18. Subsequently, the first cam channel will preferably comprise two concave segments with respect to the rotating shaft 6 if slowing down the movement of the clamp 7 is necessary at the moment in which a container 4 is released in the delivery position 18.

As described above, in the system 100 of the example shown in FIG. 1 the containers 3 are arranged in groups of two in the standby position 15 so that they are transferred to the packaging module.

Figure 3:
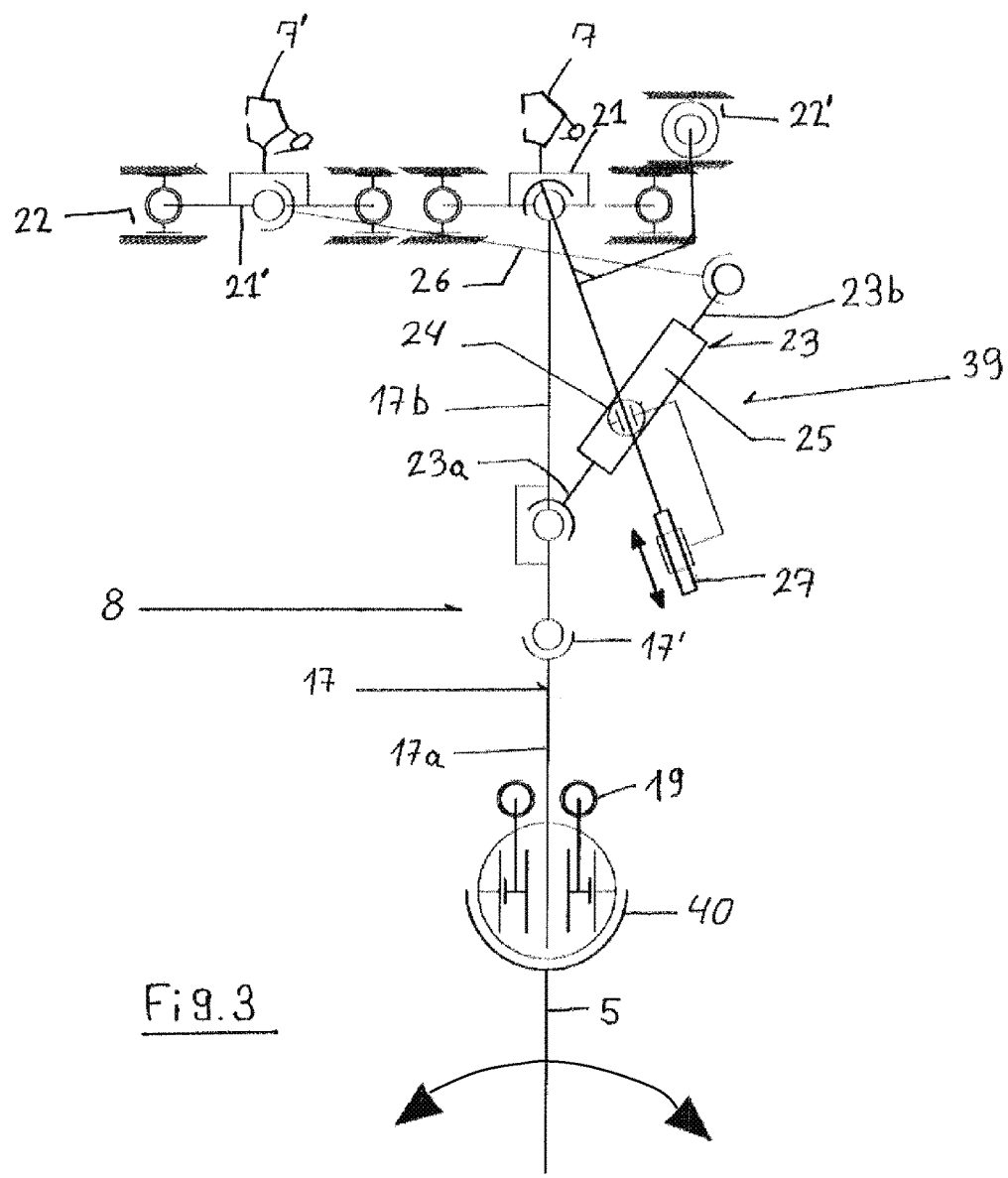
FIG. 3 is a schematic view of a second embodiment for a container transferring device.

FIG. 3 shows a variant of the invention in which groups of two clamps 7 and 7' are guided by a common mechanism 8 for each of them to secure one of the containers 3 located in the standby position 16.

In fact, it is observed in FIG. 3 that the clamps 7 and 7' are mechanically linked to one another, in this case the articulated structure 39 of the mechanism 8 comprising, in addition to the elements already described in reference to FIG. 2, a first lever 23 comprising a first end 23a attached in an articulated manner to the outer segment 17b of the radial arm 17; an articulation node 24 sliding on a slide 25; and a second end 23b attached in an articulated manner to a second lever 26 connected in an articulated manner with a second runner 21' supporting the clamp 7' of the device 1 adjacent to the clamp 7 which is supported on the first runner and which is also linked to the second cam channel 22, the articulation node 24 being able to be fixed in a predetermined position along a transmission rod 27 also attached in an articulated manner to said first runner 21 and the rotation of which is guided by the third cam channel 22'.

On one hand, the movement of the second runner 21' with respect to the rotating shaft 6 of the device 1 is controlled by the position adopted by the radial arm 17 driving the first runner 21 at each moment, and on the other hand the separation of the second runner 21' with respect to the first runner 21 can be regulated by fixing the articulation node 24 at different points along the transmission rod 27, which allows adapting the device 1 to different container formats very quickly.

Advantageously, since the gap between the clamps 7 and 7' can be varied depending on the instantaneous position of the radial arm 17, it is possible to seize the two containers 3 in the standby position 16, in which they remain together, and deliver these containers to the endless conveyor 2 separated a predetermined distance according to the distance separating every two consecutive holding means 41 in the endless conveyor 2.

Figure 5:
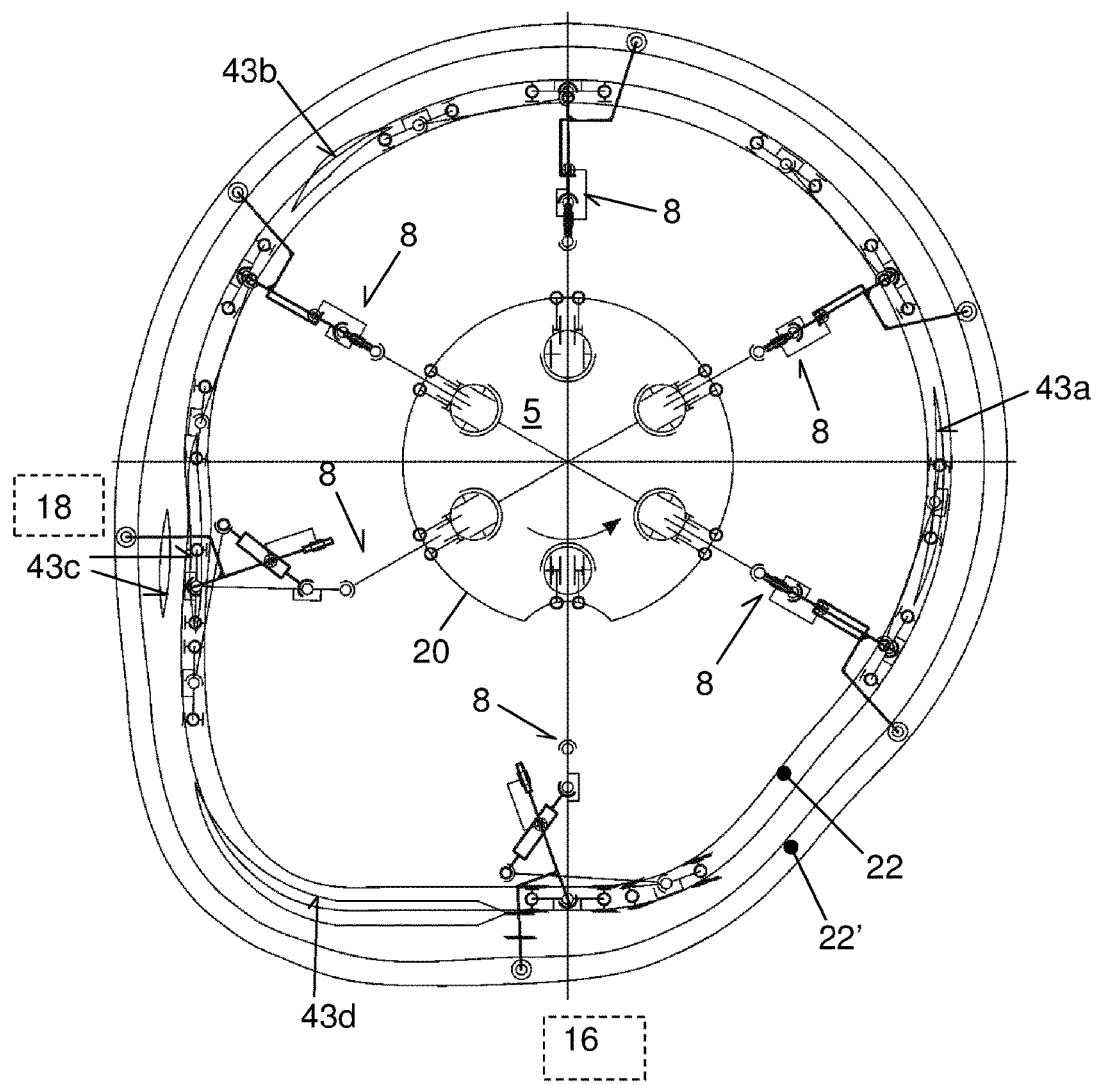
FIG. 5 is a schematic view of the rotary wheel of the device according to FIG. 3, having by way of example a total of six clamps for holding and transferring containers and their associated mechanisms.

FIG. 5 schematically shows a device 1 according to this variant of the invention in which the runners having a total of six clamps with the associated drive mechanisms 8 have been depicted. FIG. 5 also shows the complete path of the different cam channels 20, 22 and 22'. It can be seen that the control element 9 is in the shape of a discoidal body with a center in the rotating shaft 6 in which said cam channels are formed.

Figure 4:
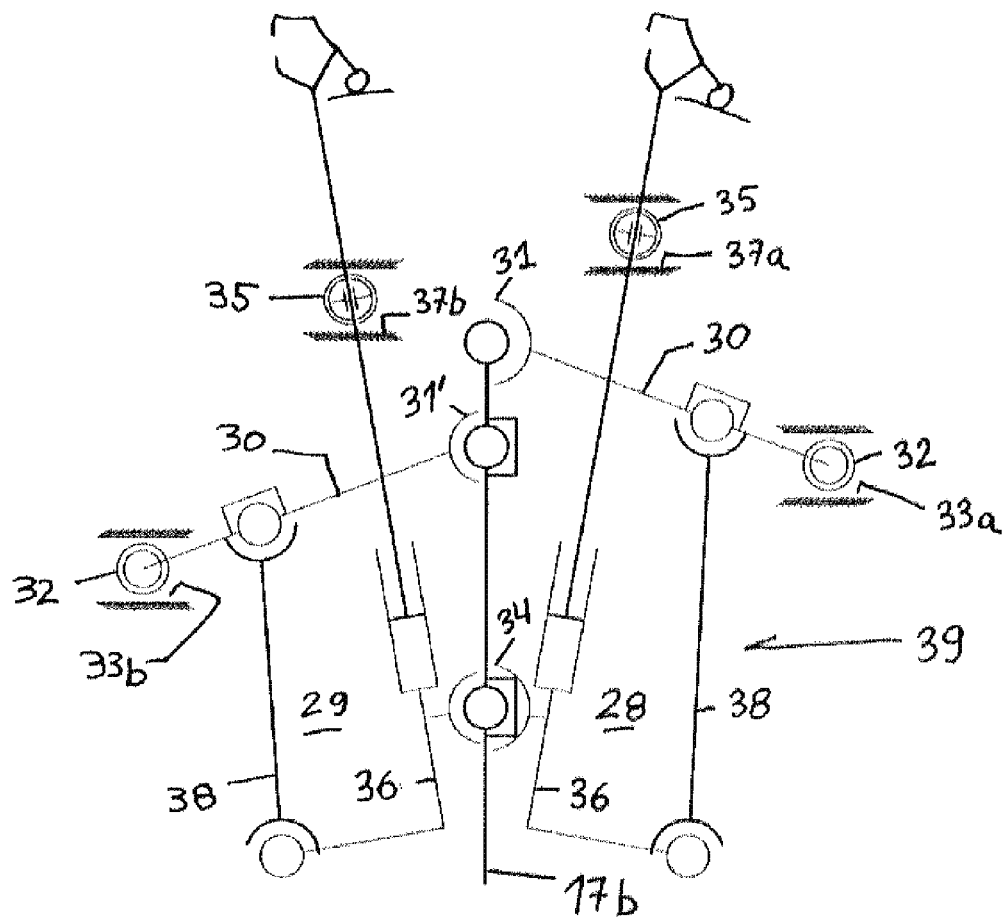
FIG. 4 is a schematic view of a part of the drive mechanism for driving two clamps according to a third embodiment for a container transferring device.

FIG. 4 shows another variant of the invention in which groups of two clamps 7 and 7' are also guided by a common mechanism 8 for each of them to secure one of the containers 3 located in the standby position 15.

Unlike the solution depicted in FIG. 3, the position adopted by each runner supporting a corresponding clamp will be determined by the contour of a pair of cam channels.

Specifically, the articulated structure 39 controlling the operation of the clamps 7 and 7' comprises two sets of rods 28, 29 articulated to one another and to the outer segment 17b of the radial arm 17 transmitting their movement to a respective clamp, each set of rods comprising: a first rod 30 attached in an articulated manner to the outer segment 17b of the radial arm 17 at a first point 31, 31' and guided by a first cam roller 32 linked to a respective cam channel 33a; 33b which forms a closed path about the rotating shaft 6 and is integral with the control component 9 of the device; a second rod 36 with a general bent shape supporting a clamp 7 or 7', which is attached in an articulated manner to the outer segment 17b of the radial arm 17 at a second point 34 and is guided by a second cam roller 35 each linked to another respective cam channel 37a; 37b which forms a closed path about the rotating shaft 6 also integral with the control component 9 of the device; and a third rod 38 connected in an articulated manner between the first and second rods 30 and 33.

In the example, the second point 34 connecting the third rods 38 of each set of rods 28, 29 to the outer segment 17b of the radial arm 17 is the same.

Figure 7:
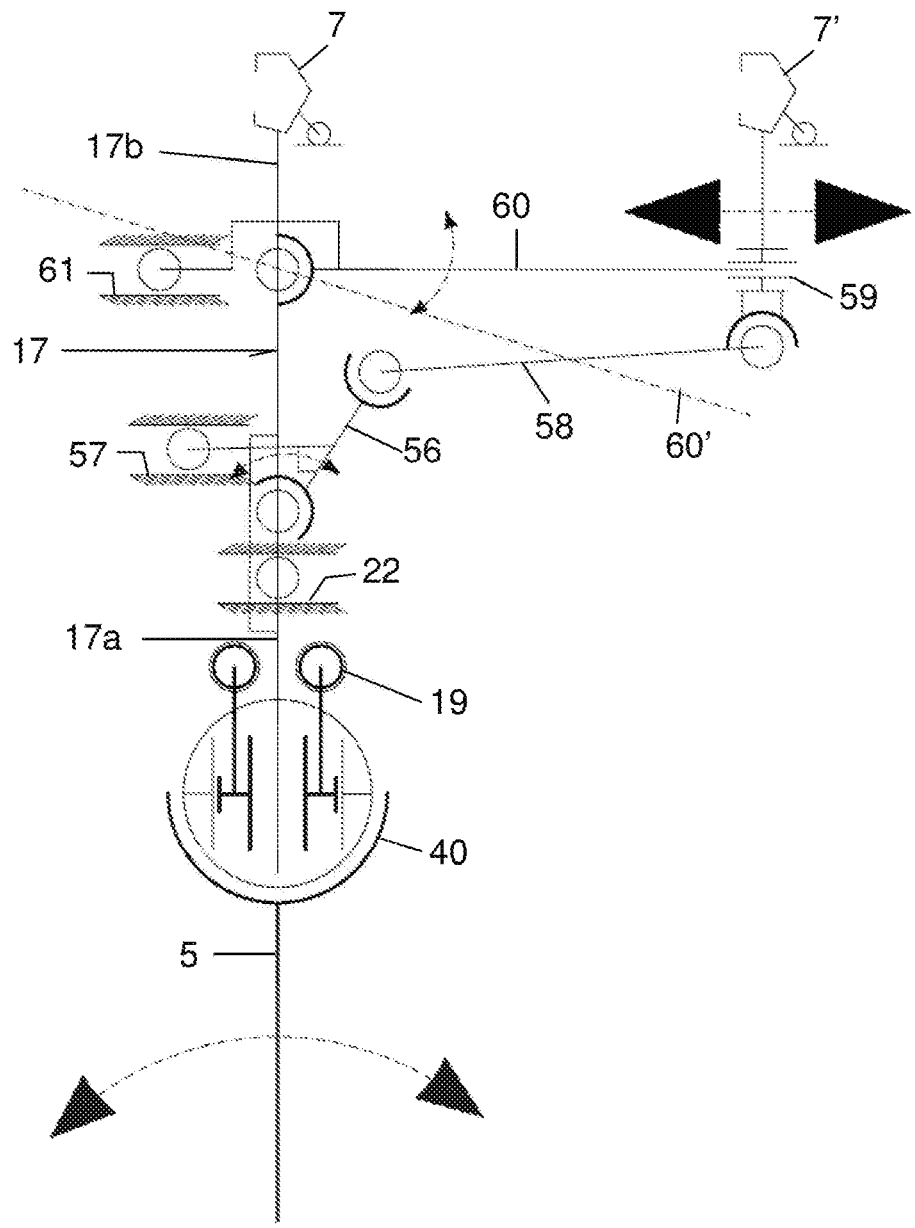
FIG. 7 is a schematic view of a third embodiment for a container transferring device.

FIG. 7 shows another alternative of the invention in which, unlike the variants of FIGS. 2 to 4, the radial arm is not articulated by a mid point and the mechanical link between two consecutive clamps 7 and 7' is different.

According to this variant, the second cam channel 22 imposes the sliding of the radial arm 17 as a whole in the cam follower 19 and the clamp 7 is supported on the radial arm 17 directly. On the other hand, to vary the separation of the clamp 7 with respect to a contiguous clamp 7', the articulated structure 39 comprises a first lever 56 attached in an articulated manner to the outer segment 17b of the radial arm 17 the relative position of which with respect to said radial arm is imposed by a second cam channel 57; a second lever 58 attached in an articulated manner to the first lever 56 and to a carriage 59, supporting the mentioned contiguous clamp 7', slidable on a guide 60 attached in turn in an articulated manner to the second outer segment 17b of the radial arm and the relative position of which with respect to the latter is imposed by a third cam channel 61. Line 60' illustrates a change of position of guide 60 relative to the second outer segment 17b.

Figure 6A:
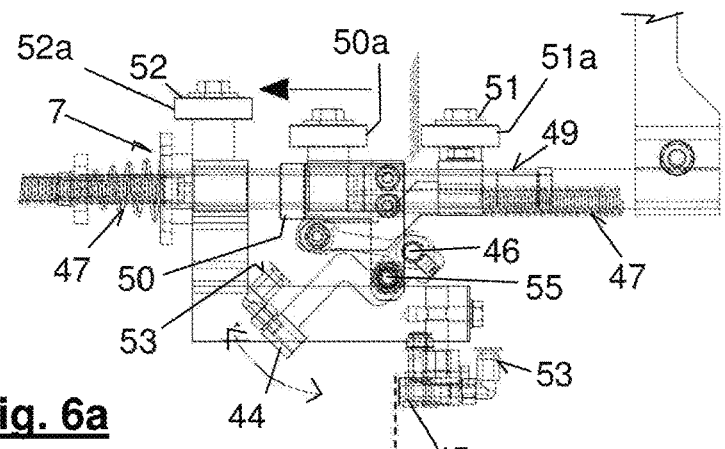
FIGS. 6a to 6c show a clamp for a transferring device according to the invention according to different operating positions.
Figure 6B:
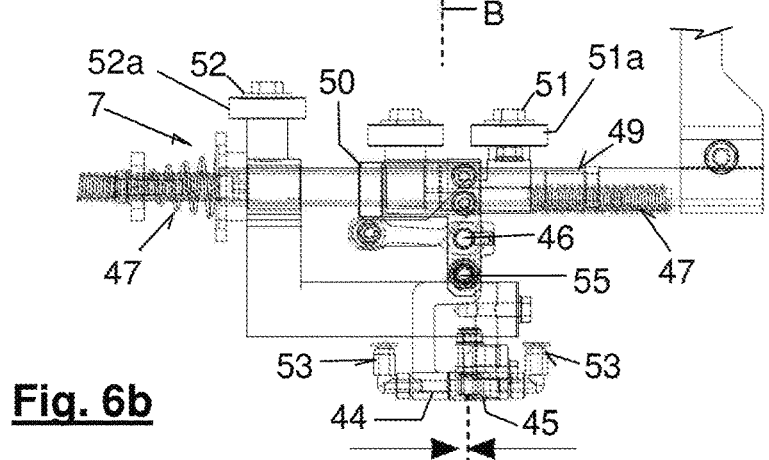
Figure 6C:
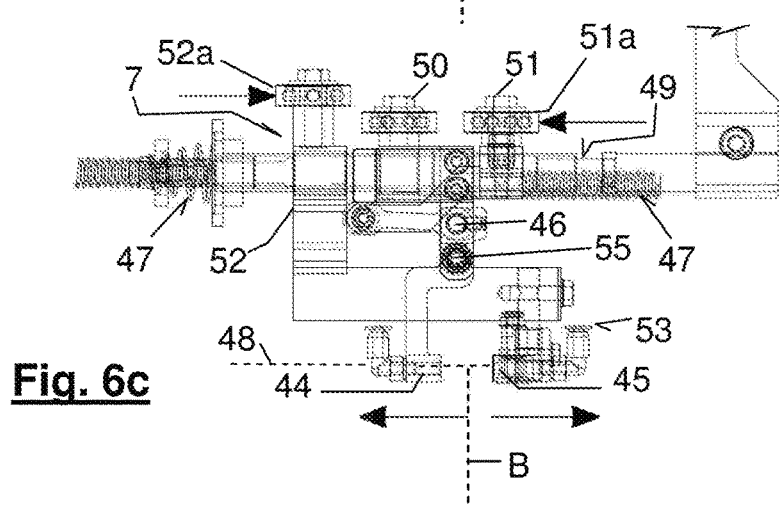

FIGS. 6a to 6c shows an embodiment with respect to clamps 7.

The illustrated clamp 7 comprises two gripping fingers 44 and 45 capable of moving closer to and away from one another for seizing or releasing a flexible container, respectively. Clamp 7 of FIGS. 6a to 6c is characterized in that the fingers 44 and 45 are capable of moving closer to and away from one another according to two different movements: by rotating one of the fingers about a rotating shaft 55 and by displacing at least one of the fingers along a straight trajectory, preferably by displacing the two fingers at the same time in opposite direction on one and the same displacement line 48 perpendicular to a gripping plane B of the container. In practice, the clamp 7 can adopt two different open positions illustrated in FIGS. 6a and 6c, one of them being suitable for being positioned optimally for seizing containers 3 arranged in their standby position 16 and the other for releasing the containers 3 once secured by the holding means 41 of the conveyor element 2.

FIG. 6a shows the clamp 7 in a first open position suitable for the clamp to be placed, without interfering with the container, in a position for seizing said container with the rotation of the outer finger 44 in the direction about the rotating shaft 55 indicated by the arrow until reaching the position illustrated in FIG. 6b. In the example, the outer finger 44 is in the shape of a third class lever the fulcrum 55 of which is attached to a first body 50 sliding on a guide 49 and the power of which, formed by the rotating shaft 46, is arranged at the end of a tie bolt connected to a second body 51 sliding on the same guide 49. The relative movement between said first and second bodies 50 and 51 on the guide 49 triggers the rotation of the outer finger 44 in one direction or another and causes clamp 7 to open or close.

In the example, moving the bodies 50 and 51 close to one another causes the clamp to close.

The movement of opening the clamp 7 for transferring the container 3 to the endless conveying element 2 of the packaging module 101 is not performed by rotating the outer finger 44. The clamp 7 is prepared so that both outer and inner fingers 44 and 45 are displaced, respectively, in an opposite direction along the displacement line 48. For such purpose, without changing the distance between the first and the second bodies 50 and 51 on the guide 49, the set formed by said bodies 50 and 51 is displaced on the guide 49 in an opposite direction to that of a third body 52 to which the inner finger 45 of the clamp 7 remains attached, all this as illustrated by FIG. 6c. This causes the separation of the fingers 44 and 45 of the clamp 7 along the displacement line 48.

Each of the fingers 44 and 45 of the clamp 7 are provided with suction means 53 which can be selectively driven to enable the walls of the container 3 to be adhered to the fingers 44 and 45 when the clamp 7 opens to assist in the operation of opening the containers which is performed by the holding means 41 of the conveyor element 2, by moving the side seams thereof closer.

In this embodiment of the clamp 7, the cam means 42 driving the clamp 7 described above and schematically illustrated in FIG. 2 are formed by surfaces 50a, 51a and 52a of the respective first, second and third bodies 50 to 52 shown in FIGS. 6a to 6c which will receive the thrust from different cam surfaces 43a to 43d, visible in FIG. 5, integral with the control component 9 of the device 1. In the depicted embodiment, the clamp 7 adopts by default the closed position of FIG. 6b subjected to the action of elastic means 47.

Therefore, now in reference to FIG. 5, the pair of lowermost runners arranges the associated clamps within reach of the containers placed in the standby position 16, the clamps adopting their closed position for seizing said containers. The rotation of the rotary body 5 in an anti-clockwise direction will drive the runners, and subsequently the clamps, in a guided manner until reaching the position in which the cam surfaces 43a will sequentially act on the clamps causing them to adopt the open position depicted in FIG. 6c, and thus transfer the containers to the holding means of the packaging module to be closed again once the cam surfaces 43a are exceeded. When the runners reach the position in which the cam surfaces 43b act again on the clamps, the clamps will adopt their open position with the inner finger 45 applied on the wall of the container and the clamps will then close when the cam surfaces 43b stop acting on them. The containers will be seized by the clamps until the runners reach the cam surfaces 43c, arranged facing the delivery position 18 of the containers, which will cause the reopening of the clamps for delivering the containers in the mentioned delivery position 18. The rotation of the rotary body 5 will continue driving the runners and thereby the associated clamps until reaching the cam surfaces 43d configured for triggering the opening of the clamps, which will adopt the position of FIG. 6a, in order to enable seizing the containers arranged in the standby position 16.

The separation of the fingers 44 and 45 of the clamp 7 along a displacement line is of interest for containers having a large format. For container having small formats, a slight upwards movement of the fingers 44 and 45, and therefore of the walls of the container stuck to the fingers by suction, can be tolerated without it affecting the correct holding of the container by the holding means 41 of the conveyor element 2.

Nevertheless, this upwards displacement may not be sufficient when the clamp 7 performs an operation of holding a container in a standby position, in which there has been unwanted interference with the container if the fingers of the clamp are not high enough.

Figure 8A:
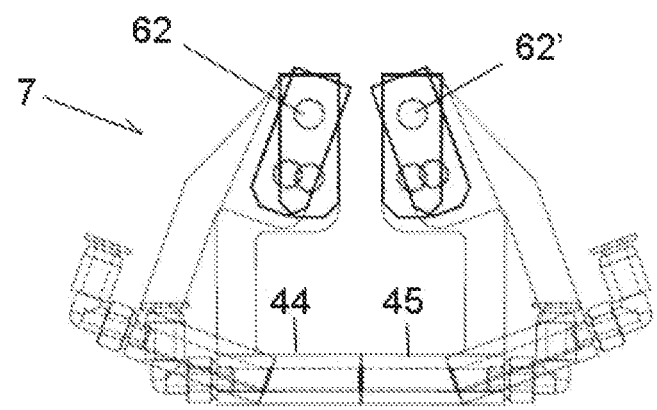
FIGS. 8a and 8b are respective schematic views of an alternative clamp for a transferring device according to the invention and in different operating positions.
Figure 8B:
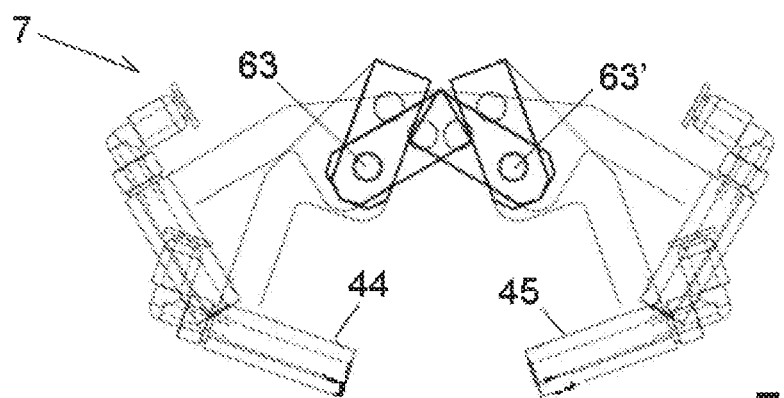

The variant of clamp 7 of FIGS. 8a and 8b offers an alternative to clamp 7 of FIGS. 6a to 6c suitable for containers having a small format.

In this clamp 7, each of the fingers 44 and 45 are able to rotate about two shafts at different distance from the end of the corresponding fingers 44 and 45. When the lamp 7 is to be opened for transfer to the holding means 41 the fingers 44 and 45 will be driven about the rotating shafts offering a greater radius of curvature, i.e., about the first shafts 62 and 62' (see FIG. 8a), which will confer the ends of the fingers 44 and 45 with a displacement with a small enough vertical component; while when the clamp 7 is to be arranged in an open position suitable for holding a container in a standby position or for allowing the container to follow a trajectory different from that of the clamp, the fingers will be driven about the rotating shafts offering a smaller radius of curvature, i.e., about the second rotating shafts 63 and 63', which will confer the ends of the fingers 44 and 45 a displacement with a big enough vertical component as to not interfere with the container which must be seized (see FIG. 8b).

This embodiment further allows displacing the ends of the fingers 44 and 45 following a trajectory having a non-constant radius, if the first fingers are rotated about the first rotating shaft and then about the second rotating shaft or vice versa in one and the same opening or closing operation.

The invention claimed is:

1. A packaging method comprising the operations of:
   conveying, including holding and manipulating, formed containers via an endless conveyor element with continuous forward movement, the endless conveyor element defining a closed trajectory imposed by a series of rotary diverting elements; and
   prior to the holding operation, transferring the formed containers from a position located outside the closed trajectory to the endless conveyor element, wherein the operation of transferring the formed containers is carried out with a container transferring device that is assembled on one of the series of rotary diverting elements, and rotates in a synchronized manner therewith,
   wherein the container transferring device includes an arm with a distal end, with a clamp on the distal end for seizing the formed containers, and a proximal end that is radially inward with respect to an outer periphery of the one of the series of rotary diverting elements, the distal end of the arm moving about a rotational axis of the one of the series of rotary diverting elements.

2. The method according to claim 1, wherein said rotary diverting element on which the container transferring device is assembled is located within an area demarcated by the closed trajectory which the endless conveyor element follows.

3. The method according to claim 1, wherein said rotary diverting element on which the container transferring device is assembled is configured in the form of a diverting wheel, and
   in the operation of transferring the formed containers, the formed containers are transferred to the endless conveyor element while the endless conveyor element contacts or links up with the diverting wheel and follows an arc with a circumferential trajectory.

4. The method according to claim 3, wherein along a section of the closed trajectory in which the endless conveyor element contacts or links up with the diverting wheel, in a first sector the container transferring device transfers the formed containers to be manipulated from a standby position located outside the closed trajectory to the endless conveyor element; and in a second sector the container transferring device transfers the formed containers that were manipulated from the endless conveyor element to a delivery position located outside the closed trajectory which said endless conveyor element follows.

5. The method according to claim 1, wherein an angle of contact between the endless conveyor element and the rotary diverting element is greater than 180°.

6. The method according to claim 1, wherein the manipulating comprises filling and sealing the containers.

7. The method according to claim 1, wherein the endless conveyor element follows a curve path defined by an outer circumference of the one of the series of rotary diverting elements for more than 180° to facilitate both transferring the formed containers from the position located outside the closed trajectory to the endless conveyor element and subsequent removal of the formed containers from the endless conveyor element while being driven about the same rotary diverting element and in synchronization therewith.

* * * * *